Jan. 28, 1969    J. E. MORGAN    3,424,473
UNIFORM RESPONSE TILTABLE STEERING ARRANGEMENT
Filed Jan. 5, 1967

INVENTOR
JERRY E. MORGAN

*Ronald C. Kemp*
ATTY

United States Patent Office 3,424,473
Patented Jan. 28, 1969

3,424,473
UNIFORM RESPONSE TILTABLE STEERING
ARRANGEMENT
Jerry E. Morgan, Clarendon Hills, Ill., assignor to International Harvester Company, Chicago, Ill., a corporation of Delaware
Filed Jan. 5, 1967, Ser. No. 607,407
U.S. Cl. 280—87                    5 Claims
Int. Cl. B62d 5/06; F16d 3/30

ABSTRACT OF THE DISCLOSURE

A tiltable steering wheel for use with a hydrostatic steering system which incorporates a constant velocity universal joint between the steering wheel and the impeller shaft of a rigidly mounted control pump in order to provide a steering response or sensitivity which is the same in all positions of the wheel.

Background of the invention

The present invention relates to hand operated steering posts which are angularly adjustable, i.e. tiltable, and is an improvement over the invention disclosed and claimed in applicant's copending application of Tiltable Steering Wheel, Serial. No. 532,443, filed March 7, 1956, now Patent No. 3,395,930. Applicant's copending application teaches the expedient of mounting the pump securely to the vehicle and providing a pivotal connection between the control pump and the tiltable steering wheel to preclude the possibility of damaging the hydraulic lines connected to the pump. From a safety standpoint, such an arrangement for protecting these lines is highly desirable. However, the stationary pump and the tiltable steering wheel create still another problem, viz, abrupt variations in steering characteristics following changes in the angular position of the wheel.

Summary

The present invention solves the problems of the prior art in tiltable steering wheels for hydrostatic systems by both isolating the pump lines and providing uniform steering characteristics. In most hydrostatic steering systems, the control pump utilized is of the gear type, including the gear-within-gear type. The output from a gear pump is not constant, but varies between limits as it rotates through 360 degrees. Normally, such a variation is not critical because the variance is relatively slight, especially when the pump capacities are small, and due to the operator's ability to adjust to the steering characteristics, i.e. the sensitivity and responsiveness of the change in vehicle's direction to a given movement of the steering wheel. To superimpose on this normal variation resulting from the characteristics of the pump, another variable, which variable is inherent with a common universal joint, would not be too critical either because again, the operator could, after a short time, acclimate himself to the steering characteristics of the particular vehicle being operated. Nevertheless, where the steering wheel axis is at a large angle with respect to the pump axis, some operators could find the non-uniform response during one complete revolution of the steering wheel to be troublesome, due to the fact that the variation in the pump output and the speed variation resulting from the universal joint are additive. Even this cumulative effect would not necessarily constitute a safety hazard, if the variations, i.e. the degree or amount of non-constant response, were uniform, since the operator can acquaint himself with that vehicle's steering characteristics, and would do so before attempting to operate the vehicle at the full limit of its ability. However, when the wheel is tiltable, the abrupt change in steering characteristics resulting from a change in angular wheel position would create a condition which would necessitate operator re-acclimation. One of the reasons for providing a tiltable steering wheel is for the comfort and convenience of the operator, who must remain in an operative attitude for long periods of time. Since this becomes monotonous and tiring, selective tilt positions for the steering wheel are provided to permit the operator to change his position, e.g. to stand where he was seated previously and vice versa. In such circumstances, the operator, having been driving from one position for a long time, would have acquired confidence and skill in controlling the vehicle. However, at the moment the angularity of the steering wheel is changed, the steering characteristics change also. Safe operation of the vehicle thereafter, until reacclimation has been achieved, is impaired, primarily because the operator will be anticipating the same response of the vehicle to a given movement of the wheel when the response will, in fact, be different.

It is, therefore, an object of the present invention to provide an inherently safe tiltable steering wheel arrangement for a hydrostatic steering system, and to provide such a tiltable steering arrangement which will achieve the same steering characteristics, even though these characteristics do not include a constant response throughout one revolution of the wheel, in all tilted positions of the steering wheel.

Description of the preferred embodiment

Figure 1:
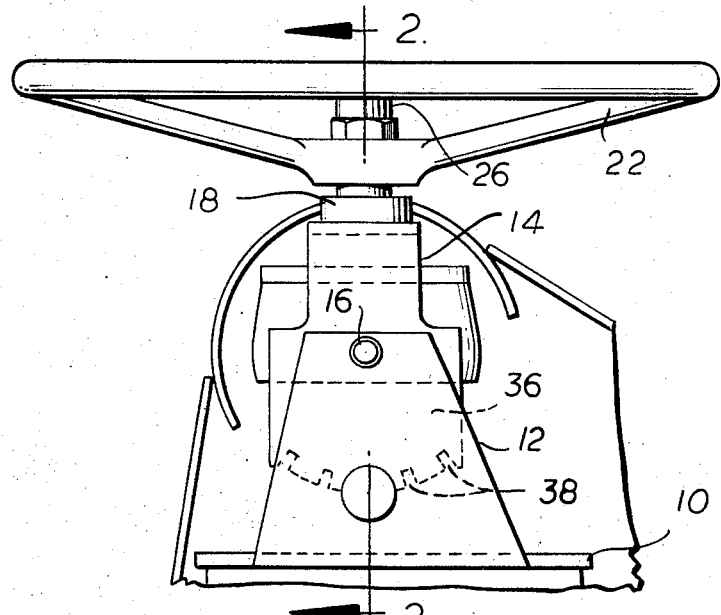
FIGURE 1 is a side elevational view of a preferred embodiment of the present invention.
Figure 2:
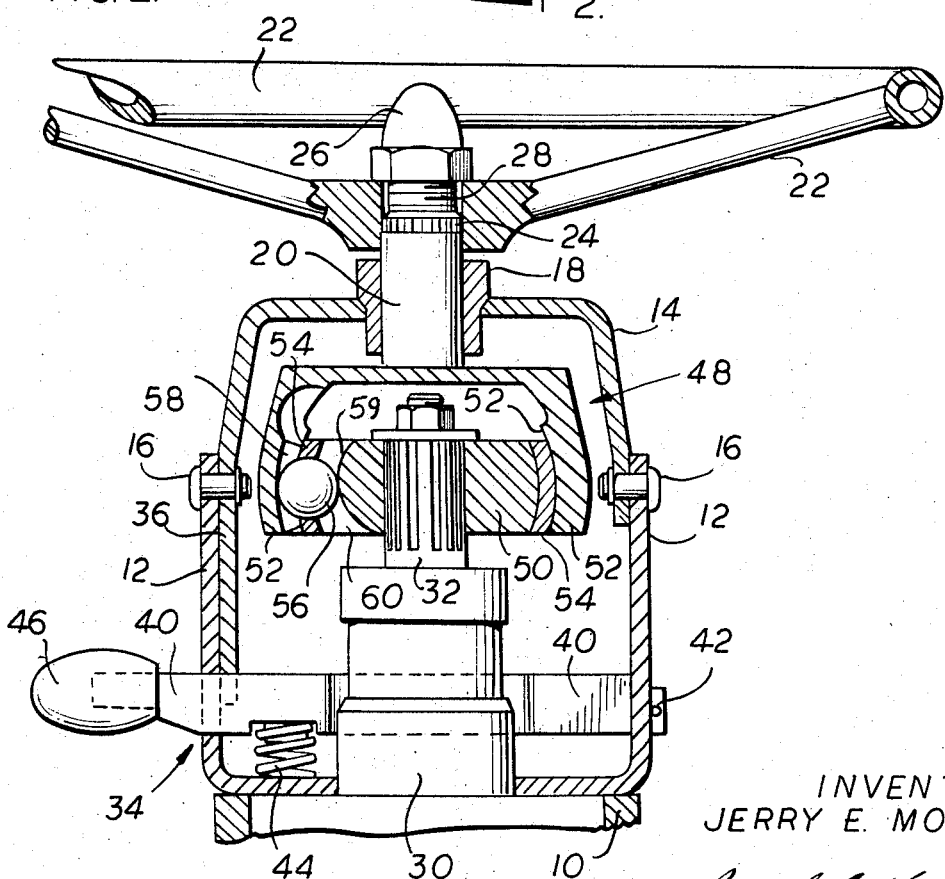
FIGURE 2 is a cross-sectional view taken on line 2—2 of FIGURE 1.

Referring now in detail to the drawing, there is shown a frame member 10 which is secured to, or forms a part of the frame of a vehicle, such as a farm tractor, and having a bifurcated support 12 attached thereon. A carrier member 14 is pivotally secured to the support 12 by means of the pivot pins 16, and is provided with a bearing 18. The bearing 18 rotatably receives a steering post 20 to which a steering wheel 22 is irrotatably secured by conventional means, such as complementary engaging splines 24, and retained thereon by a crown nut 26 received by a threaded section 28 on the end of the post 20. A gear pump 30 is mounted on the frame member 10, and includes an input or impeller shaft 32 rotatably retained therein. A latching means, indicated generally at 34, is provided to permit selective angular positioning of the steering wheel 22, and consists essentially of an elongate leg 36 formed as an extension of the carrier member 14 and having a plurality of notches 38 along the extreme outer edge thereof, and a latch bar 40 capable of engaging one of the notches 38. The bar 40 is retained in a slot, not shown, formed in one arm of the bifurcated support 12 by a pin 42 and is urged upwardly into a position for engagement with the notches 38 by a compression spring 44 positioned between the intermediate or connecting section of the bifurcated support 12 and the latch bar 40. A knob 46 is secured to the free end of the bar 40 to facilitate manual grasping for depression of the bar against the bias of the spring 44, in which position the elongate leg 36 is freed thereby permitting the angular position of the steering wheel to be changed.

A constant velocity universal joint, indicated generally at 48, is utilized to operatively connect the steering post 20 to the impeller shaft 32, which joint may be the bell type constant velocity universal joint manufactured by the Gear Grinding Machine Company of Detroit, Mich., and sold under the trademark Rzeppa. This joint 48 comprises an inner race 50, which is splined to the shaft 32 for rotation therewith, an outer race 52 which is formed integral with or otherwise secured to the post 20, and a cage 54 for retaining a plurality of balls, one of which is shown at 56 between an arcuate surface 59 of a slot 60 formed on the inner race 50 and individual recesses 58 in the outer race 52. The axis of the pivot pins 16 passes through the center of the shaft 32 and thus the center of the joint 48. Pivoting of the steering wheel about the pins 16, upon release of the latching means 34, to obtain a different angular or tilt position for the wheel 22 causes the outer race 52 to pivot relative to the inner race 50. The arrangement of the arcuate surface 59 permits the distance from the center of the shaft to point of force application by the ball 56 to vary as the outer race is rotated by the wheel. The net result is that the rotation of the steering wheel is arcuately reproduced in the pump shaft 32, thereby providing the transmission of uniform rotary motion from the steering wheel to the pump shaft.

It will be appreciated that the constant velocity universal joint, in combination with the gear pump and the steering wheel, provides a steering arrangement having a constant "feel," i.e., a uniform response to given movements of the steering wheel, in all angular positions thereof. The safe operation of the vehicle is greatly enhanced since the operator is not required to anticipate what change in steering characteristics will result from changing the wheel's tilt position. Such an arrangement is especially advantageous where the pump is a gear-within-gear type combined with a valving arrangement which requires that a predetermined pressure be developed from the control pump before fluid flow from the engine-driven power pump is permitted to be directed to the steering cylinder forming a part of the steering linkage. This latter arrangement would further complicate the steering responsiveness because a given incremental movement on one angular position in the plane of the wheel would allow power assist for steering where the same movement at another position in the plane of the wheel would not permit power assist and vice versa.

I claim:
1. In a vehicle having a steering wheel which is both rotatable to provide directional control of the vehicle and tiltable to provide optimum convenient manual manipulation thereof by an operator, latching means for selectively securing the steering wheel in a plurality of tilted positions, and a hydrostatic steering circuit including a control pump affixed to the vehicle, the improvement comprising:
universal connector means operatively securing the steering wheel to the control pump for producing the same output from the pump in response to incremental rotations of the steering wheel in all of said tilted positions,
whereby the operator obtains the same degree of steering sensitivity for a given manipulation of the steering wheel regardless of the tilted position selected.
2. In a vehicle steering arrangement according to claim 1 wherein said connector means comprises a constant velocity universal joint.
3. In a vehicle steering arrangement according to claim 2 wherein said pump comprises a body member secured to the tractor and an impeller shaft rotatably mounted in said body member, said shaft being positioned in the plane defined by the movement of the rotational axis for said steering wheel during tilting thereof.
4. In a vehicle steering arrangement according to claim 3 wherein said joint includes an outer race and an inner race, said impeller shaft being secured to said inner race and fastening means securing said steering wheel to said outer race.
5. In a vehicle steering arrangement according to claim 4, wherein said control pump is a gear pump.

References Cited

UNITED STATES PATENTS

| | | | |
|---|---|---|---|
| 1,429,101 | 9/1922 | Ross | 60—54.5 |
| 1,995,987 | 3/1935 | Keese | 64—21 |
| 2,046,584 | 7/1936 | Rzeppa | 64—21 |
| 3,199,625 | 8/1965 | Liebreich | 180—77 |
| 3,205,968 | 9/1965 | Rose | 74—493 X |
| 3,302,478 | 2/1967 | Pauwels | 74—493 |
| 3,365,976 | 1/1968 | Reed et al. | 74—493 |

KENNETH H. BETTS, *Primary Examiner.*

U.S. Cl. X.R.

64—21